US008616744B2

(12) United States Patent
Uchiyama et al.

(10) Patent No.: US 8,616,744 B2
(45) Date of Patent: Dec. 31, 2013

(54) VEHICLE HEADLAMP

(75) Inventors: Takahiro Uchiyama, Yokkaichi (JP); Izumi Suzuki, Yokkaichi (JP); Masaaki Nakabayashi, Shizuoaka (JP)

(73) Assignees: Sumitomo Wiring Systems, Ltd. (JP); Koito Manufacturing Co., Ltd. (JP)

( * ) Notice: Subject to any disclaimer, the term of this patent is extended or adjusted under 35 U.S.C. 154(b) by 513 days.

(21) Appl. No.: 12/961,945

(22) Filed: Dec. 7, 2010

(65) Prior Publication Data

US 2011/0141756 A1 Jun. 16, 2011

(30) Foreign Application Priority Data

Dec. 11, 2009 (JP) ................................. 2009-282041

(51) Int. Cl.
*B60Q 1/00* (2006.01)

(52) U.S. Cl.
USPC ........... 362/548; 362/190; 362/191; 362/475; 362/476; 362/507; 362/538; 313/318.1; 313/318.11

(58) Field of Classification Search
USPC .......... 313/318.1, 318.11; 362/548, 190, 191, 362/475, 476, 498, 499, 507, 519, 523, 538, 362/542, 549
See application file for complete search history.

(56) References Cited

U.S. PATENT DOCUMENTS 2,237,956 A * 4/1941 Arras ............................ 439/313
3,302,195 A * 1/1967 Fuller ...................... 340/815.51
3,497,865 A * 2/1970 Willans ......................... 439/549
3,614,712 A * 10/1971 Taormina et al. ............. 439/549
3,775,731 A * 11/1973 Merki et al. .................. 439/556
3,840,730 A * 10/1974 Andres et al. ................. 362/468
4,851,976 A * 7/1989 McMahan et al. ............ 362/548
5,010,455 A * 4/1991 Luallin et al. ................. 362/519
5,160,281 A 11/1992 Culver
6,390,657 B1 * 5/2002 Billot ............................ 362/519
6,976,776 B2 * 12/2005 Kakidaira et al. ............ 362/548
2004/0183445 A1 * 9/2004 Kruger et al. ................. 313/635

FOREIGN PATENT DOCUMENTS

EP 0766036 4/1997
FR 2742709 6/1997

OTHER PUBLICATIONS

European Search Report.

* cited by examiner

*Primary Examiner* — Mary McManmon
(74) *Attorney, Agent, or Firm* — Gerald E. Hespos; Michael J. Porco; Matthew T. Hespos

(57) ABSTRACT

A vehicle headlamp includes a lamp unit having a bulb attaching portion into which a bulb is inserted and attached, an outer housing configured to engage with the lamp unit at a location behind the bulb attaching portion, an inner housing disposed inside the outer housing such that a clearance is provided in a radial direction between the outer housing and the inner housing and such that, relative to the outer housing, the inner housing is movable in an axial direction and is rotatable about an axis extending in the axial direction, and a spring disposed between the outer housing and the inner housing to bias the inner housing toward the bulb in the axial direction. When the outer housing is engaged with the lamp unit, the spring biases the inner housing such that a flange of the bulb is pressed against the bulb attaching portion.

6 Claims, 7 Drawing Sheets

VEHICLE HEADLAMP

CROSS-REFERENCE TO RELATED APPLICATION

The present application claims priority from Japanese Patent Application No. 2009-282041 filed on Dec. 11, 2009, the entire content of which is incorporated herein by reference.

BACKGROUND OF THE INVENTION

1. Field of the Invention

The present invention relates to a vehicle headlamp and, more particularly, to a bulb attaching structure of the vehicle headlamp.

2. Description of the Related Art

According to a related art bulb attaching structure of a vehicle headlamp, an insertion hole is formed through a reflector of a lamp unit to insert a light emitting portion of a bulb, and behind the insertion hole, an attaching portion is provided to attach a connector housing to which terminals protruding from a rear face of the bulb are fitted and connected. The terminals on the rear side of the bulb are inserted and connected to the connector housing, and the light emitting portion of the bulb is then inserted into the insertion hole of the reflector from a back side. As a flange of the bulb is pushed against a hole edge portion on a back face of the reflector around the insertion hole, the connector housing is attached to the attaching portion, whereby the bulb is securely attached to the reflector (see, e.g., JP 2002-373509 A).

In headlamps of this type, when a bulb is blown out, or in order to improve performances such as luminance of light emission, it is not infrequent that the bulb is replaced with another bulb, and it is possible that a bulb of a different manufacturer is selected.

While dimensions and the like of the bulbs are standardized to a certain extent, standardization level of a connecting portion of the bulb, including the terminals, is relatively low, which means that a tolerance range is relatively wide. In fact, there are differences among the manufacturers with respect to a protruding length and an arrangement of a terminal of a bulb, a configuration of a portion of a flange of the bulb that is brought into contact with a hole edge portion around an insertion hole, a dimension from the flange to a bottom face of the connecting portion from which the terminal protrudes, etc.

Under such circumstances, when there is a difference in a protruding length of the terminal and/or a dimension from the flange to the bottom face of a connecting portion upon replacement of the bulb, in a state in which the new bulb is inserted into the insertion hole of the reflector to place the flange onto the hole edge portion, the connector housing may not reach its attaching portion, or even if the connector housing is attached to the attaching portion, the connecting portion of the bulb may move, i.e. play between the back face of the reflector and the connector housing.

Further, while three positioning tabs are provided to protrude from an outer circumference of the flange of the bulb and to engage with respective positioning recess portions on the back face side of the reflector so that a rotational position of the attached bulb is fixed, when there is a difference in a positional relationship between a the positioning tabs and the terminals with respect to a circumferential direction upon replacement, the connector housing connected to the bulb is shifted around its axis from a proper orientation, in which case the connector housing cannot be attached.

In some cases, furthermore, depending on the configuration of the portion of the flange that contacts the hole edge portion of the insertion hole, the bulb may have to be attached with its axis being tilted, which causes a number of problems. For example, because the axis of the housing connector that is connected to the bulb also tilts, the connector housing cannot be attached.

SUMMARY OF THE INVENTION

Illustrative aspects of the present invention provide a vehicle headlamp in which a bulb and a connector can be reliably attached irrespective of a variation in configuration of a connecting portion of the bulb.

According to an aspect of the invention, a vehicle headlamp includes a bulb having a flange and a terminal, a terminal fitting to which the terminal of the bulb is coupled, a lamp unit having a bulb attaching portion into which the bulb is inserted and attached from behind, an outer housing configured to engage with the lamp unit at a location behind the bulb attaching portion, an inner housing disposed inside the outer housing such that a clearance is provided in a radial direction between the outer housing and the inner housing and such that, relative to the outer housing, the inner housing is movable in an axial direction and is rotatable about an axis extending in the axial direction, and a spring disposed between the outer housing and the inner housing to bias the inner housing toward the bulb in the axial direction. The outer housing includes a first restricting portion. The inner housing includes a terminal housing portion configured to accommodate the terminal fitting, a bulb pressing portion configured to contact a bottom portion of the bulb, and a second restricting portion. When the outer housing is engaged with the lamp unit, the spring biases the inner housing such that the bulb pressing portion presses the bulb to press the flange of the bulb against the bulb attaching portion of the lamp unit. When the outer housing is disengaged from the lamp unit, the spring biases the inner housing such that the inner housing is displaced toward the bulb in the axial direction and such that the first restricting portion and the second restricting portion are engaged with each other to restrict a further displacement of the inner housing.

Other aspects and advantages of the invention will be apparent from the following description, the drawings and the claims.

DETAILED DESCRIPTION OF THE PREFERRED EMBODIMENTS

Hereinafter, exemplary embodiments of the invention will be described in detail with reference to the drawings.

Figure 1:
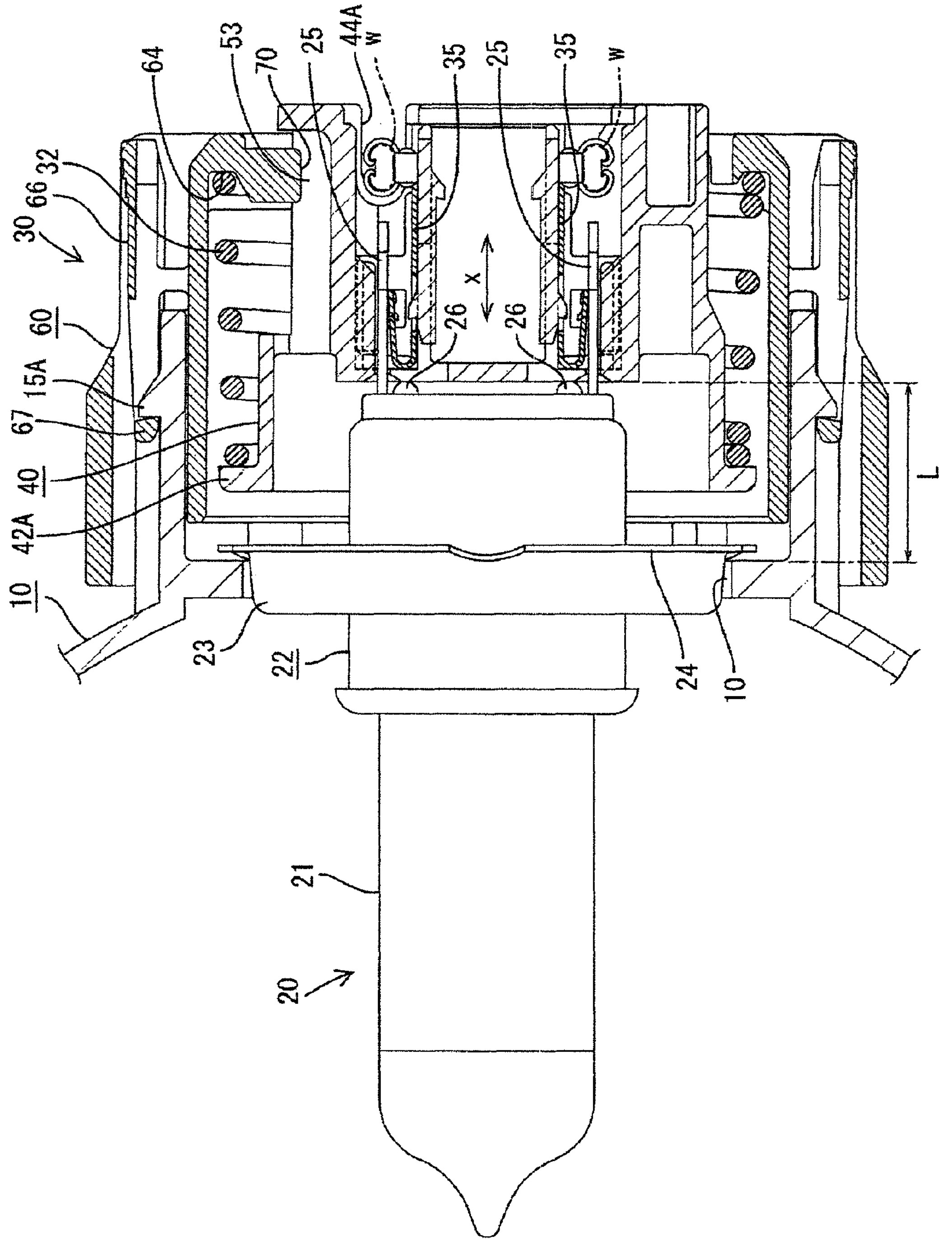
FIG. 1 is a longitudinal sectional view of a headlamp according to an exemplary embodiment of the invention.

As shown in FIG. 1, a headlamp according to an exemplary embodiment of the invention includes a lamp unit having a reflector 10, a bulb 20 attached to the reflector 10 to serve as a light source of the lamp unit, and a connector 30 connected to the bulb 20. The connector 30 is provided on a terminal of a power feeding cord to feed power to the bulb 20.

The bulb 20 is a halogen lamp (an H4 bulb) and has a light emitting portion 21 and a connecting portion 22 on a rear side of the light emitting portion 21. The connecting portion 22 is larger than the light emitting portion 21, and is formed with a fitting portion 23 having a larger diameter on a central part in a longitudinal direction of the connecting portion 22. Three male terminals 25, each having a shape of a tab, are arranged to protrude from a rear face of the connecting portion 22 at an interval of 90 degrees along a semi-circumferential region. A plurality of semispherical protrusions 26 is arranged on the rear face of the connecting portion 22 concentrically with a center of the rear face of the connecting portion 22 and at radially inner positions than the male terminals 25. A flange 24 having a larger diameter than the fitting portion 23 is formed on a rear side of the fitting portion 23 of the connecting portion 22. On an outer circumference of the flange 24, three positioning tabs (not shown) are formed at an angular interval in a radially protruding manner to fix a rotational position of the bulb 20.

Figure 6:
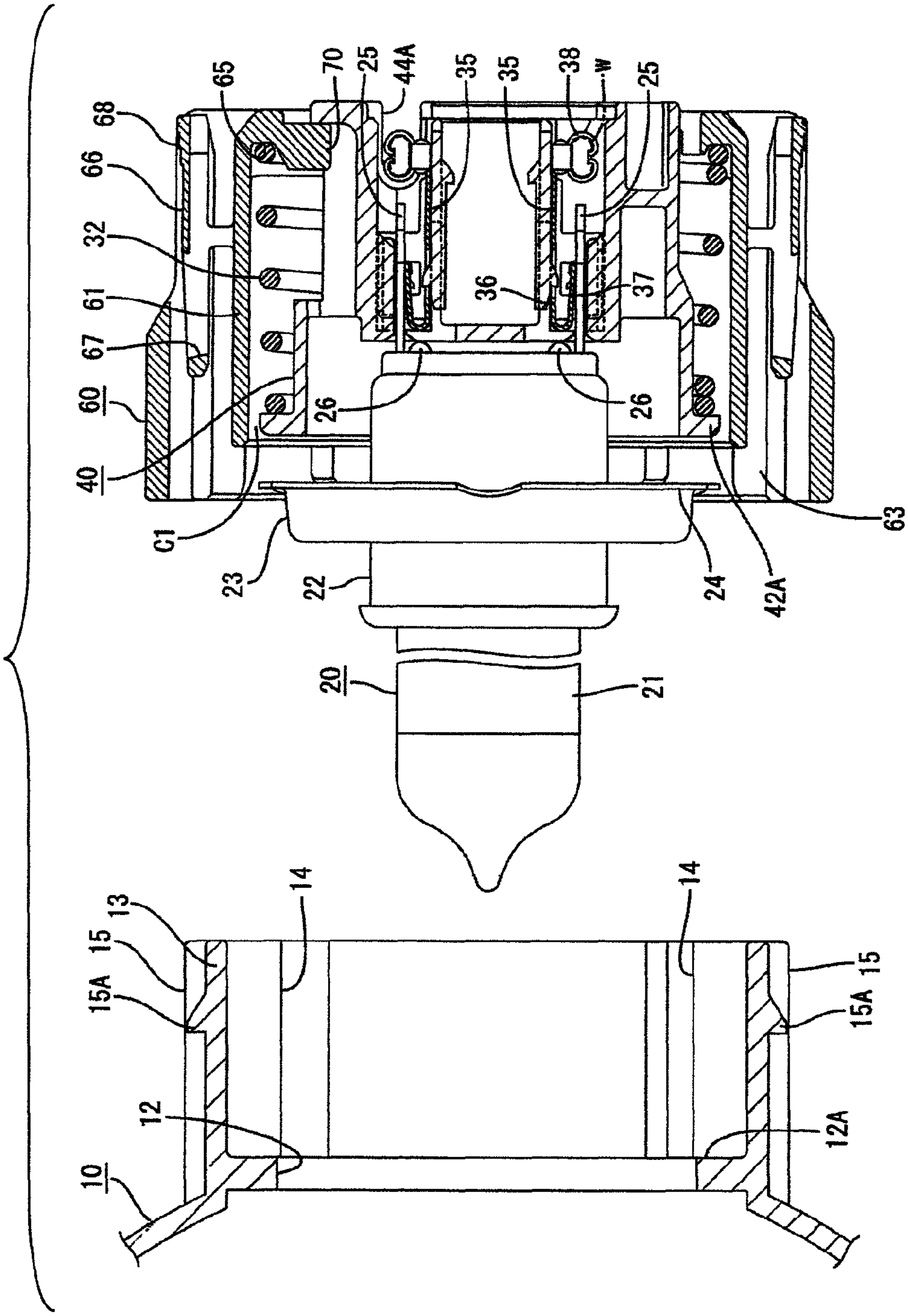
FIG. 6 is a longitudinal sectional view illustrating the bulb before being attached.

The reflector 10 is formed as a one-piece structure and is disposed inside a lamp chamber of the headlamp. As shown in FIG. 6, a rear end portion of the reflector 10 is formed with an insertion hole 12 (a bulb attaching portion) into which the fitting portion 23 of the bulb 20 is tightly inserted, so that the flange 24 can contact a hole edge portion 12A on a back side of the insertion hole 12. An attaching cylinder 13 having a cylindrical shape is protruded rearward from a position around the insertion hole 12 on the back face of the rear end portion of the reflector 10 where it does not interfere with the flange 24.

On an inner peripheral surface of the attaching cylinder 13, positioning grooves 14 are formed along an axial direction so that the three positioning tabs on the flange 24 of the bulb 20 can be inserted into the respective positioning grooves 14. On an outer peripheral surface of the attaching cylinder 13, on the other hand, engaging portions 15 are formed on upper and lower locations to attach and to lock an outer housing 60 of the connector 30. Further, three guide ribs (not shown) are formed on the outer peripheral surface of the attaching cylinder 13 at an interval in a circumferential direction to guide the outer housing 60 when fitting the outer housing 60.

Figure 2:
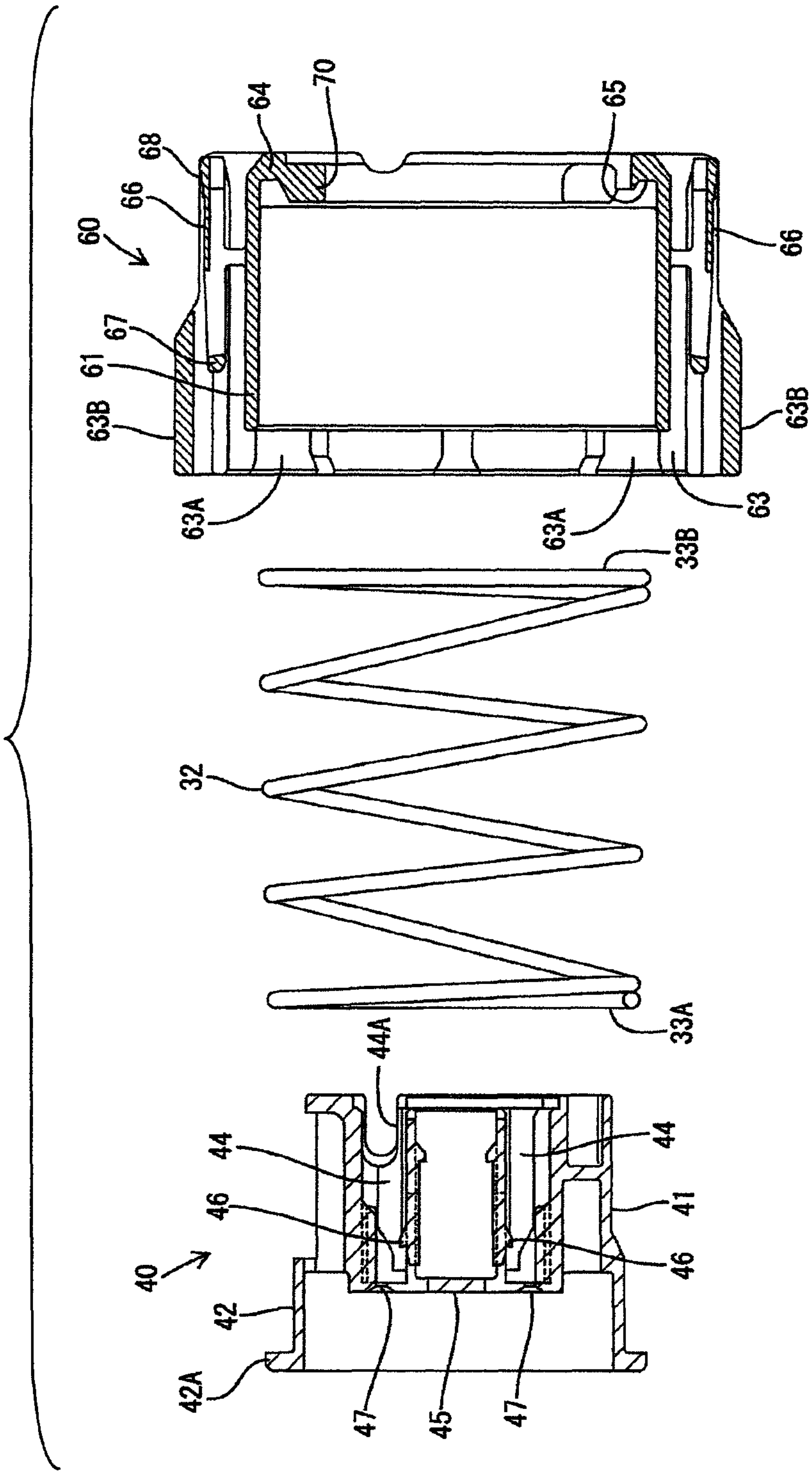
FIG. 2 is a longitudinal sectional view of a connector in an exploded manner.

As shown in FIG. 2, the connector 30 has an inner housing 40 and the outer housing 60, which are both made of synthetic resin material. The inner housing 40 and the outer housing 60 are attached together via a conical coil spring 32.

Figure 3:
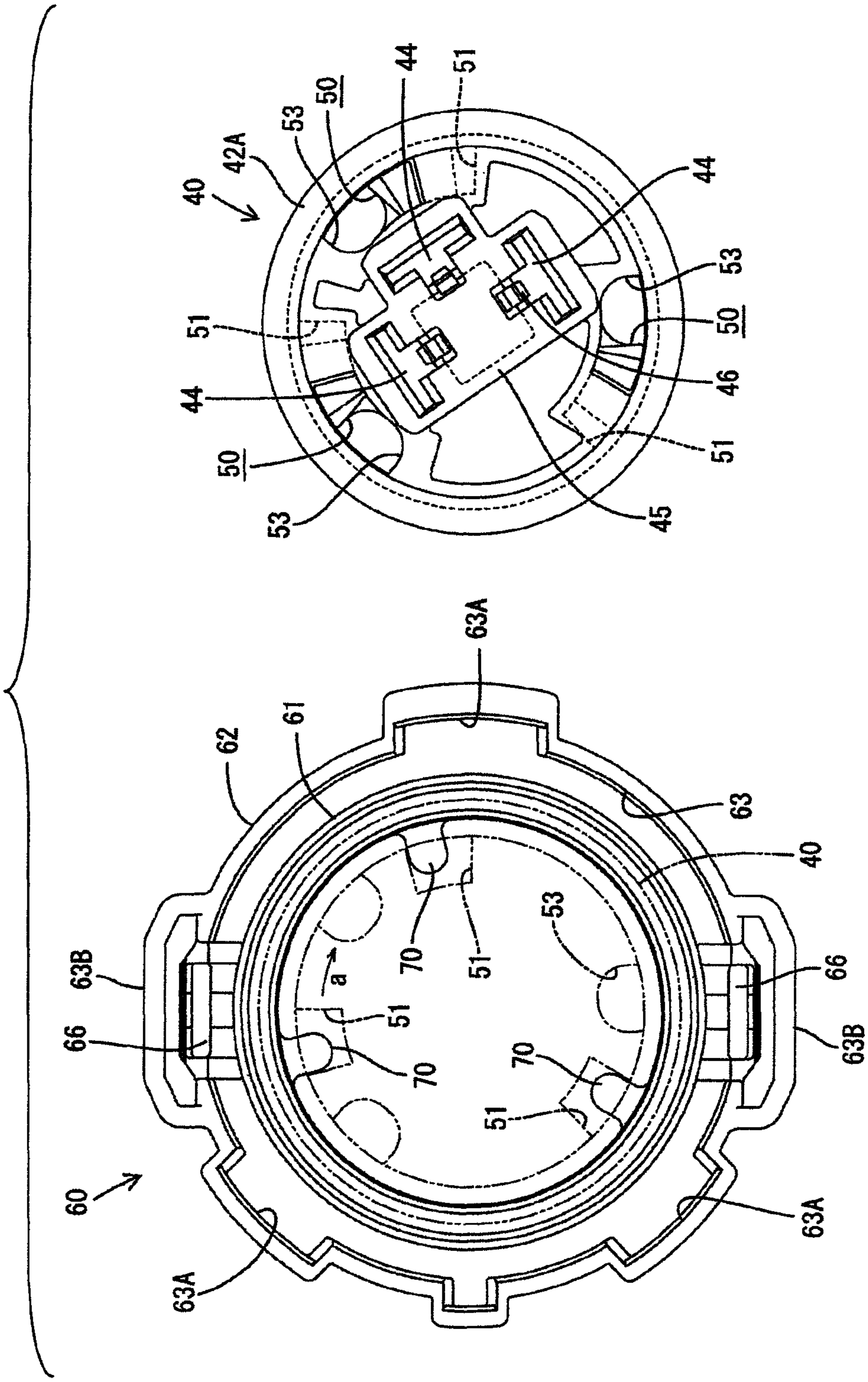
FIG. 3 is a front view of an outer housing and an inner housing.

As shown in FIG. 3, the inner housing 40 includes a terminal housing portion 41 having a circular front face, and a cylindrical hood portion 42 formed on a front end face of the terminal housing portion 41. On a front end of the hood portion 42, an outwardly extending flange 42A (hereinafter, an outward flange 42A) is formed to receive an end face of a small diameter portion 33A of the spring 32.

Inside the terminal housing portion 41, three cavities 44 for accommodating are formed to accommodate female terminals 35 (terminal fittings) to which the male terminals 25 of the bulb 20 are connected respectively. The cavities 44 are arranged to correspond to the arrangement of the male terminals 25. The cavities 44 are formed inside a T-shaped portion 45 (a bulb pressing portion) which is disposed to extend toward to the front from a front portion of the terminal housing portion 41. A front face of the T-shaped portion 45 is configured to contact the protrusions 26 on the rear face of the bulb 20.

Each of the female terminals 35 includes a rectangular connecting portion 36 having an elastic contact piece 37, and a barrel 38 provided on a rear side of the connecting portion 36 such that the barrel 38 is oriented in a direction perpendicular to the connecting portion 36. The connecting portion 36 is configured such that, even if a protruding length of the associated male terminals 25 varies, the male terminal 25 is smoothly inserted to ensure electrical connection between the male terminal 25 and the elastic contact piece 37. A terminal portion of an electric wire w is connected to the corresponding female terminal 35 by crimping the barrel 36, such that an axial direction of the terminal portion of the electric wire w is perpendicular to the female terminal 35.

Each of the cavities 44 is opened rearward, and a recess groove 44A is cut out on a side face to provide space for the electric wire w. The female terminal 35 is inserted into the corresponding cavity 44 from behind, and is pushed into the cavity 44 with the electric wire w being placed in the recess groove 44A. When the female terminal 35 is fully pushed in, the female terminal 35 elastically engages with a lance 46 inside the cavity 44, whereby the female terminal 35 is accommodated inside the cavity 44 in a fixed manner. On a front side of each of the cavities 44, a terminal inserting port 47 is formed to insert the corresponding male terminal 25 into the cavity 44 from the terminal inserting port 47.

As shown in FIGS. 2 and 3, the outer housing 60 includes an inner cylindrical portion 61 and an outer cylindrical portion 62. The inner cylindrical portion 61 has an almost equal length as the inner housing 40. The outer cylindrical portion 62 is configured and arranged to radially overlap with a front portion of the inner cylindrical portion 61 with a radial gap between the inner cylindrical portion 61 and the outer cylindrical portion 62, and to extend further toward the front than the inner cylindrical portion 61. An inside diameter of the inner cylindrical portion 61 is larger than a diameter of the outward flange 42A of the inner housing 40. That is, as shown in FIG. 6, a clearance C1 is given between an inner peripheral surface of the inner cylindrical portion 61 and an outer circumference of the outward flange 42A. On an inner periphery of a rear end of the inner cylindrical portion 61, an inwardly extending flange 64 (hereinafter, an inward flange 64) is formed. A front face of the inward flange 64 is formed with a receiving groove 65 extending in a circumferential direction to receive an end face of a large diameter portion 33B of the spring 32.

An annular fitting space 63 is formed between the inner cylindrical portion 61 and the outer cylindrical portion 62 of the outer housing 60 to tightly fit the attaching cylinder 13 of the reflector 10 therein. The fitting space 63 includes three guide grooves 63A into which the guide ribs of the reflector 10 are inserted respectively. Bulged portions 63B are provided on upper and lower sides of the fitting space 63 to insert the engaging portions 15 on the upper and lower surfaces of the attaching cylinder 13 of the reflector 10 therein from the front. Further, lock arms 66 are provided on an outer peripheral surface of a rear portion of the inner cylindrical portion 61 at a location behind the respective bulged portions 63B. Each of the lock arms 66 has a lock portion 67 configured to engage with a lock protrusion 15A of the corresponding engaging portion 15. The lock portion 67 is provided at a distal end of the lock arm 66, and is arranged between the bulged portion 63B and the inner cylindrical portion 61. The lock arm 66 is elastically displaceable like a seesaw such that the lock portion 67 can move up and down.

A coupling structure between the inner housing 40 and the outer housing 60 will be described below in further detail. On an inner periphery of the inward flange 64 of the inner cylindrical portion 61 of the outer housing 60, three engaging portions 70 are formed at an angular interval. More specifically, each of the engaging portions 70 is thicker than the inward flange 64 so as to forwardly bulge from a front face of the inward flange 64, and is protruded toward a center of the inner cylindrical portion 61. A protruding end and a rear face of each of the engaging portions 70 are rounded.

Figure 5:
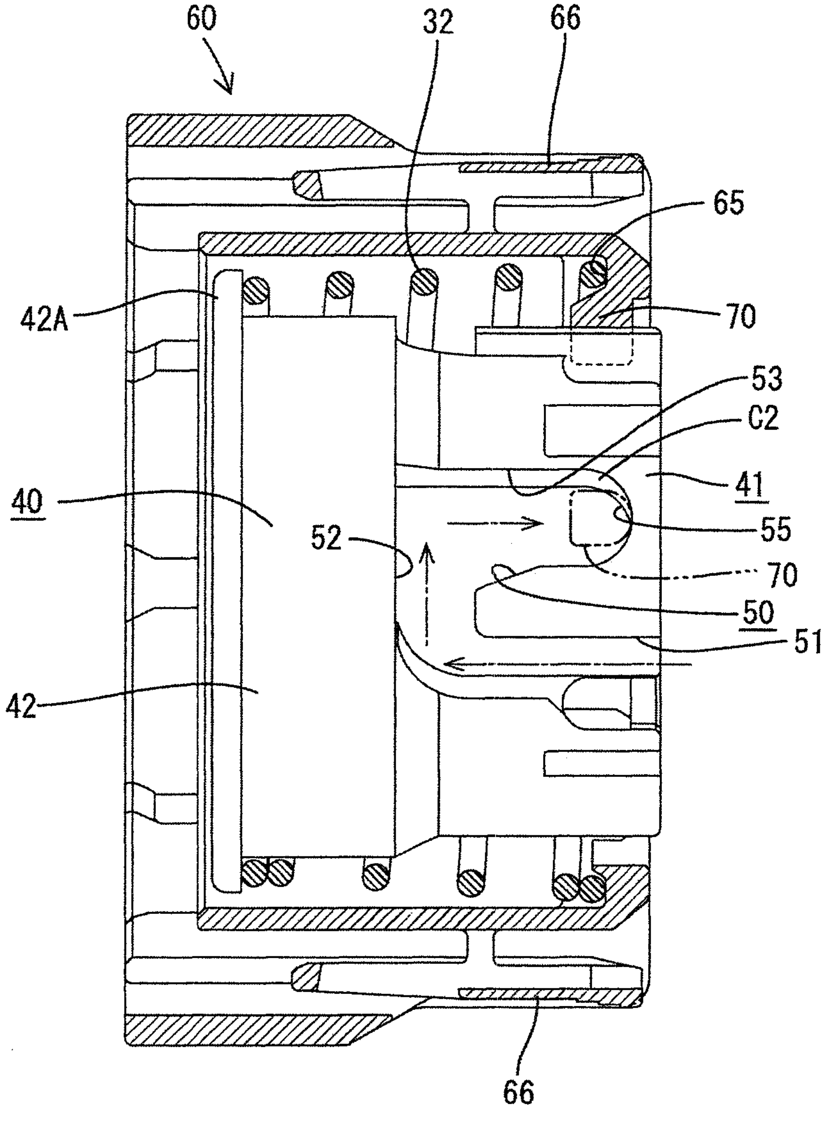
FIG. 5 is a longitudinal sectional view of the assembled connector.

On an outer peripheral surface of the terminal housing portion 41 of the inner housing 40, on the other hand, three inserting paths 50 are formed in a grooved manner at locations corresponding to the engaging portions 70 of the outer housing 60 so that the engaging portions 70 are inserted into the respective inserting paths 50. As shown in FIG. 5, each of the inserting paths 50 has an introducing portion 51, a corner portion 52 and a return portion 53. The introducing portion 51 is opened at a rear end face of the terminal housing portion 41, and is formed to extend forward in the axial direction to the vicinity of a base of the hood portion 42. The corner portion 52 is formed extend perpendicularly from the innermost end of the introducing portion 51 in a clockwise direction in a rear view. The return portion 53 is formed to backwardly extend from the end of the corner portion 52 toward the rear end face of the terminal housing portion 41 parallel to the introducing portion 51 to return to location slightly on an inner side of the rear end face of the terminal housing portion 41. A rear end face on the dead end of the return portion 53 has a circular arc shape, and serves as an engaging face 55 (a restricting portion) with which the engaging portion 70 (another restricting portion) engages.

The return portion 53 of the inserting path 50 is formed to be wider than the engaging portion 7. That is, the engaging portion 70 is fitted in the return portion 53 with a clearance C2 in a circumferential direction. Accordingly, the inner housing 40 is rotatable around its axis inside the outer housing 60 by an amount corresponding to the clearance C2.

When assembling the connector 30, first of all, the spring 32 is inserted into the outer housing 60 in the state shown in FIG. 2 so that the end of the large diameter portion 33B is fitted in the receiving groove 65. Subsequently, the inner housing 40 is inserted into the spring 32 from the front so that the end of the small diameter portion 33A of the spring 32 contacts a back face of the outward flange 42A of the inner housing 40. When inserting the inner housing 40, a rotational position of the inner housing 40 is set such that the introducing portions 51 of the inserting paths 50 are matched with the corresponding engaging portions 70 of the outer housing 60 respectively as shown in FIG. 3.

The inner housing 40 is pushed into the outer housing 60 by elastically contracting the spring 32 and while guiding the engaging portions 70 along the respective introducing portions 51 of the inserting paths 50 as shown in dotted lines of FIG. 3. When the engaging portions 70 reach the innermost ends of the respective introducing portion 51, the inner housing 40 is rotated in a clockwise direction as shown in an arrow a of FIG. 3. When each of the engaging portions 70 is guided through the corresponding corner portion 52 and reaches the innermost end of the return portion 53, the pushing force is released from the inner housing 40, whereby the inner housing 40 is pushed back by the restoring elastic force of the spring 32 and each of the engaging portion 70 is moved along the corresponding return portion 53. When the engaging portion 70 hits the engaging face 55 of the return portion 53, the inner housing 40 is stopped from being pushed back. During the operations described above, the engaging portion 70 is moved inside the inserting path 50 along the arrows shown in FIG. 5. In this manner, the connector 30 is assembled such that the spring 32 is interposed between the inner housing 40 and the outer housing 60.

When the connector 30 is assembled, the female terminals 35 connected to the terminal portions of the corresponding electric wires w are inserted into the respective cavities 44 of the inner housing 40 from the rear side, and are accommodated inside the inner housing 40 such that the female terminals 35 are held by the respective lances 46. Further, the three male terminals 25 protruding from the rear face of the connecting portion 22 of the bulb 20 are inserted into the respective terminal inserting ports 47 of the cavities 44 on the front face of the inner housing 40 until the protrusion 26 on the rear face of the connecting portion 22 of the bulb 20 hit the front face of the T-shaped portion 45 of the inner housing 40, whereby each of the male terminals 25 is inserted into the connecting portion 36 of the corresponding female terminal 35 inside the cavity 44, and the male and female terminals 25, 35 are connected to each other.

When the bulb 20 is attached to the connector 30, the bulb 20 is then attached into the insertion hole 12 of the reflector 10 as shown in FIG. 6. The light emitting portion 21 is inserted into the insertion hole 12 through the inside of the attaching cylinder 13, and when the bulb 20 is inserted by an certain amount, the positioning tabs on the outer circumference of the flange 24 are fitted in the positioning grooves 14 on the inner periphery of the attaching cylinder 13 to fix the rotational position of the bulb 20, and the bulb 20 is further pushed in. When the fitting portion 23 of the connecting portion 22 of the bulb 20 is fitted in the insertion hole 12 and the flange 24 contacts the hole edge portion 12A on the back side of the insertion hole 12, only the outer housing 60 is pushed and moved while elastically contracting the spring 32, during which the lock arms 66 are elastically displaced and moves over the respective lock protrusions 15A. When the outer housing 60 is further pushed and moved so that the lock arms 66 are restored from displacement as shown in FIG. 1, the lock portions 67 are engaged with the respective lock protrusions 15A, whereby the outer housing 60 is securely attached to the attaching cylinder 13.

Figure 7:
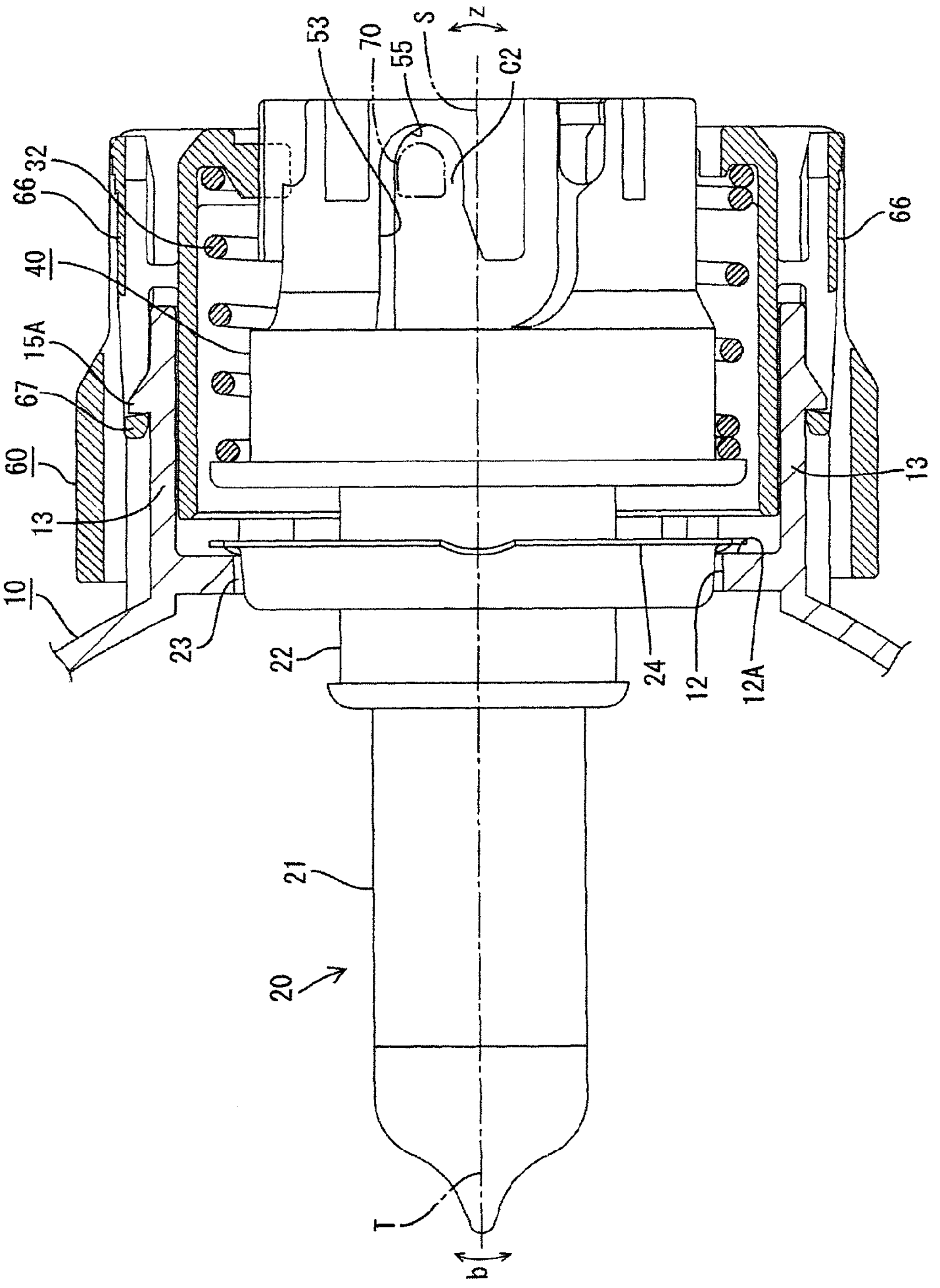
FIG. 7 is a partially sectional side view illustrating the bulb after being attached.

In this state, the spring 32 is elastically contracted so that the inner housing 40 is biased forward by the restoring elastic force of the spring 32, and the T-shaped portion 45 of the inner housing 40 pushes the rear face of the connecting portion 22 of the bulb 20 so that the flange 24 is elastically pressed against the hole edge portion 12A on the back face of the insertion hole 12. Consequently, the bulb 20 is attached. As shown in FIG. 7, moreover, the engaging portions 70 of the outer housing 60 is separated from the engaging faces 55 of the respective inserting paths 50 in the inner housing 40, and are disposed in the respective return portions 53 with the clearance C2. Accordingly, the inner housing 40 is attached rotatably and tiltably inside the outer housing 60.

While the initial assembling operation of the headlamp has been described above, when the bulb 20 is blown out after a certain period of use, or in order to improve performances such as luminance of emitting light, the bulb 20 may be replaced with another bulb 20. In those cases, operating portions 68 of the lock arms 66 are pinched in the state shown in FIG. 1 to unlock the lock portions 67 from the respective lock protrusions 15A, and the connector 30 is then pulled out rearward together with the bulb 20. Subsequently, the bulb 20 is newly attached to the front face of the inner housing 40, and is then attached back into the insertion hole 12 of the reflector 10 in the manner described above, and the outer housing 60 of the connector 30 is attached and locked onto the attaching cylinder 13.

Upon replacement of the bulb, it is possible that the bulb 20 of a different manufacturer is selected. While dimensions or the like of the bulb 20 is standardized to some extent, a tolerance is relatively wide with respect to the connecting portion 22, including the male terminal 25, of the bulb 20. According to the exemplary embodiment described above, it is possible to absorb such variations in the bulb 20.

For example, the female terminals 35 accommodated inside the cavities 44 of the inner housing 40 are configured such that each of the connecting portions 36, including the elastic contact piece 37, enables the male terminals 25 of the bulb 20 to contact the elastic contact pieces 37 without hampering the insertion of the male terminals 25, irrespective of a variation in the protruding length of the male terminals 25 of the bulb 20. Therefore, even when there is a difference in the protruding length of the male terminals 25, it is possible to ensure electrical connection between the male and female terminals 25 and 35.

Further, when there is a difference in a length L from the flange 24 of the bulb 20 to the protruding ends of the protrusions 26 on the rear face of the connecting portion 22, the length difference is absorbed by a displacement of the inner housing 40 in a front-rear direction with the elastic expansion or contraction of the spring 32 as shown by an arrow x in FIG. 1. That is, a dimension from the flange 24 of the bulb 20 to a position at which the outer housing 60 is locked can be maintained constant. Consequently, the bulb 20 is properly attached into the insertion hole 12, and the outer housing 60 is also properly attached to the attaching cylinder 13.

Figure 4:
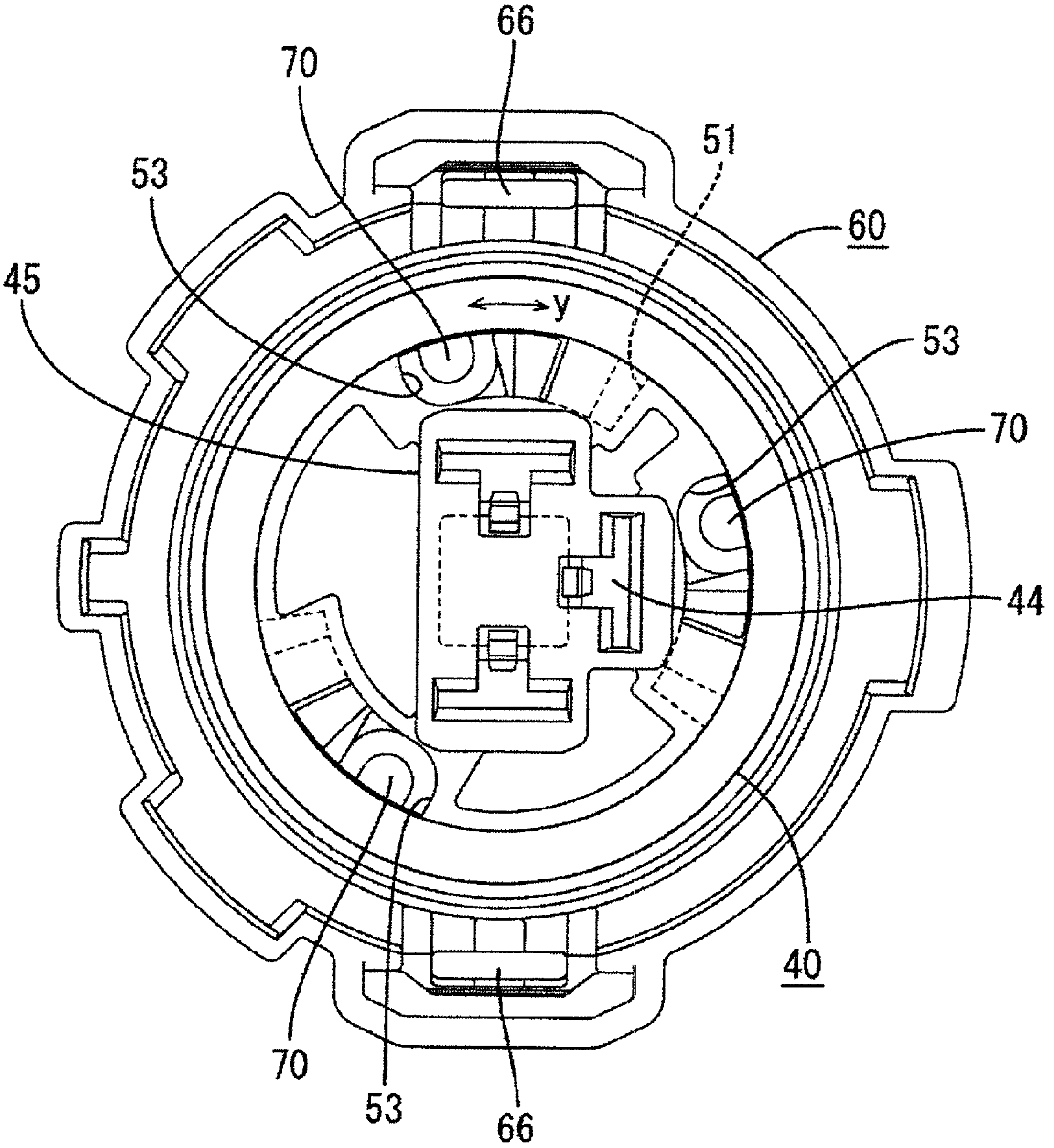
FIG. 4 is a front view of the assembled connector.

When there is a shift in a positional relationship along a circumferential direction between the male terminals 25 and the positioning tabs on the flange 24 for fixing the rotational position of the bulb 20, the inner housing 40 is rotated around the axis S in the outer housing 60 as shown by an arrow y in FIG. 4 by an amount corresponding to the clearance C2 between the engaging portion 70 in the return portion 53 of the inserting path 50, so that the shift is absorbed.

When the bulb 20 has to be attached with its axis T tilted as shown by an arrow b in FIG. 7 due to a variation in the configuration of the base portion on the front face of the flange 24 of the bulb 20, the inner housing 40 is also tilted as shown by an arrow z in FIG. 7 such that its axis S is aligned with the axis T of the bulb 20, while ensuring the attachment of the outer housing 60 to the attaching cylinder 13.

As described above, according to the exemplary embodiment, even when attaching the bulb 20 having a variation in the length and/or arrangement of the male terminals 25, the configuration of the connecting portion 22, etc, it is possible to accurately attach the bulb 20 and the connector 30 while absorbing the variation.

While the present invention has been described with reference to a certain exemplary embodiment thereof, the scope of the present invention is not limited to the exemplary embodiment described above, and it will be understood by those skilled in the art that various changes and modifications may be made therein without departing from the scope of the present invention as defined by the appended claims.

For example, with regard to the connecting structure between the inner housing and the outer housing, the engaging portions may be formed n an outer periphery of the inner housing, and an inserting path may be formed on an inner periphery of the outer housing, in a reverse manner to the exemplary embodiment.

Further, the outer housing may not necessarily be attached to the attaching cylinder provided around the insertion hole of the reflector, and may be attached to a different structure.

Further, the connector may be configured to have a limit with respect to an inserting depth of the male terminals of the bulb. Even in this case, a variation in the protruding length of the male terminals can be absorbed.

Further, the electric wires connected to the female terminals inside the cavities of the inner housing may not necessarily be led out from the cavities in a perpendicular manner, and may be linearly led out toward the rear of the cavities.

What is claimed is:

1. A vehicle headlamp comprising:

a bulb comprising a flange and a terminal;

a terminal fitting to which the terminal of the bulb is coupled;

a lamp unit comprising a bulb attaching portion into which the bulb is inserted and attached from behind;

an outer housing configured to engage with the lamp unit at a location behind the bulb attaching portion;

an inner housing disposed inside the outer housing such that a clearance is provided in a radial direction between the outer housing and the inner housing and such that, relative to the outer housing, the inner housing is movable in an axial direction and is rotatable about an axis extending in the axial direction; and a spring disposed between the outer housing and the inner housing to bias the inner housing toward the bulb in the axial direction;

wherein the outer housing comprises a first restricting portion, wherein the inner housing comprises:

a terminal housing portion configured to accommodate the terminal fitting;

a bulb pressing portion configured to contact a bottom portion of the bulb; and a second restricting portion, wherein, when the outer housing is engaged with the lamp unit, the spring biases the inner housing such that the bulb pressing portion presses the bulb to press the flange of the bulb against the bulb attaching portion of the lamp unit and such that the first restricting portion is separated from the second restricting portion, and wherein, when the outer housing is disengaged from the lamp unit, the spring biases the inner housing such that the inner housing is displaced toward the bulb in the axial direction and such that the first restricting portion and the second restricting portion are engaged with each other to restrict a further displacement of the inner housing.

2. The vehicle headlamp according to claim 1, wherein one of the first and second restricting portions comprises an engaging portion protruding in the radial direction, and the other of the first and second restricting portions comprises an engaging face configured to engage with the engaging portion, wherein one of the outer and inner housings comprising the other of the first and second restricting portions is formed with an inserting path along which the engaging portion is guided when attaching the inner housing to the outer housing, the inserting path comprising:

an introducing portion extending from a side face of the one of the outer and inner housings along the axial direction;

a corner portion extending in a circumferential direction around the axis from the introducing portion and defining an innermost end of the inserting path; and a return portion extending from the corner portion toward the side face along the axial direction and terminating at the engaging face, wherein, when the outer housing is disengaged from the lamp unit, the engaging portion and the engaging face are engaged with each other, and wherein the return portion is configured such that the engaging portion is disposed inside the return portion with a clearance in the circumferential direction.

3. The vehicle headlamp according to claim 1, wherein the bulb comprises a light emitting portion, wherein the lamp unit comprises a reflector formed with an insertion hole through which the light emitting portion of the bulb is inserted, wherein the reflector comprises a hole edge portion on a back side of the reflector and around the insertion hole to form the bulb attaching portion together with the insertion hole, and an attaching cylinder disposed around the hole edge portion to protrude from the back side of the reflector, wherein the flange of the bulb contacts the hole edge portion, and wherein the outer housing is configured to engage with the attaching cylinder.

4. The vehicle headlamp according to claim 3, wherein the attaching cylinder comprises a lock portion, and wherein the outer housing comprises a lock member that elastically engages with the lock portion to securely attach the outer housing to the attaching cylinder when the bulb is attached into the lamp unit.

5. The vehicle headlamp according to claim 1, wherein, when the outer housing is engaged with the lamp unit, the first restricting portion and the second restricting portion are disengaged from each other.

6. The vehicle headlamp according to claim 1, wherein the inner housing comprises an outward flange configured to receive and end force of the spring, and the clearance is provided between an inner peripheral surface of the outer housing and an outer circumference of the outward flange.

* * * * *